(12) United States Patent
Asai et al.

(10) Patent No.: US 10,750,084 B2
(45) Date of Patent: Aug. 18, 2020

(54) IMAGE PROCESSING APPARATUS AND IMAGE PROCESSING METHOD

(71) Applicant: SONY CORPORATION, Tokyo (JP)

(72) Inventors: Haruka Asai, Kanagawa (JP); Akira Matsui, Kanagawa (JP); Hideho Une, Tokyo (JP)

(73) Assignee: SONY CORPORATION, Tokyo (JP)

(*) Notice: Subject to any disclaimer, the term of this patent is extended or adjusted under 35 U.S.C. 154(b) by 19 days.

(21) Appl. No.: 16/314,815

(22) PCT Filed: May 9, 2017

(86) PCT No.: PCT/JP2017/017549
§ 371 (c)(1),
(2) Date: Jan. 2, 2019

(87) PCT Pub. No.: WO2018/012094
PCT Pub. Date: Jan. 18, 2018

(65) Prior Publication Data
US 2019/0312996 A1    Oct. 10, 2019

(30) Foreign Application Priority Data
Jul. 13, 2016 (JP) ................. 2016-138935

(51) Int. Cl.
*H04N 5/232* (2006.01)
*G06T 7/55* (2017.01)
(Continued)

(52) U.S. Cl.
CPC ........... *H04N 5/23229* (2013.01); *G06T 7/55* (2017.01); *H04N 5/232* (2013.01);
(Continued)

(58) Field of Classification Search
CPC ............... H04N 5/232; H04N 5/23209; H04N 5/23229; H04N 5/3572; H04N 5/35721;
(Continued)

(56) References Cited

U.S. PATENT DOCUMENTS

| | | | | |
|---|---|---|---|---|
| 2009/0284627 A1* | 11/2009 | Bando | ............... | G06K 9/00201 348/273 |
| 2012/0294512 A1 | 11/2012 | Matsuda et al. | | |
| 2013/0308005 A1* | 11/2013 | Takahashi | .......... | H04N 5/23212 348/222.1 |

FOREIGN PATENT DOCUMENTS

| | | |
|---|---|---|
| EP | 2525320 A1 | 11/2012 |
| JP | 2004-088409 A | 3/2004 |

(Continued)

OTHER PUBLICATIONS

International Search Report and Written Opinion of PCT Application No. PCT/JP2017/017549, dated Jul. 18, 2017, 06 pages of ISRWO.

*Primary Examiner* — Daniel M Pasiewicz
(74) *Attorney, Agent, or Firm* — Chip Law Group (57) ABSTRACT

[Object] To estimate lens information with no change in photographing conditions. [Solution] An image processing apparatus according to the present disclosure includes: a positional displacement estimation unit configured to estimate positional displacement between a plurality of input images obtained by photographing an identical photographic subject; an alignment processing unit configured to align positions of the plurality of input images on the basis of the estimated positional displacement; and a lens information estimation unit configured to estimate information of a lens used to photograph the input image depending on a model indicating a deterioration component of the lens on the basis of the aligned input images.

13 Claims, 9 Drawing Sheets

(51) Int. Cl.
*H04N 5/357* (2011.01)
*H04N 9/04* (2006.01)

(52) U.S. Cl.
CPC ....... *H04N 5/23209* (2013.01); *H04N 5/3572* (2013.01); *H04N 9/04517* (2018.08)

(58) Field of Classification Search
CPC ... H04N 9/04517; H04N 9/04519; G06T 7/55
See application file for complete search history.

(56) References Cited

FOREIGN PATENT DOCUMENTS

| | | |
|---|---|---|
| JP | 2009-159093 A | 7/2009 |
| JP | 2012-244395 A | 12/2012 |
| JP | 2014-036262 A | 2/2014 |
| JP | 2015-128226 A | 7/2015 |

\* cited by examiner

| IMAGE-CAPTURING DETERIORATION | RELEVANT LENS ELEMENTS |
|---|---|
| LUMINANCE SHADING | APERTURE VALUE, FOCAL LENGTH |
| COLOR SHADING | APERTURE VALUE, FOCAL LENGTH, FOCUS DISTANCE |
| LENS BLUR (SPHERICAL/COMA/ ASTIGMATISM/FIELD CURVATURE) | APERTURE VALUE, FOCAL LENGTH, FOCUS DISTANCE |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/017549 filed on May 9, 2017, which claims priority benefit of Japanese Patent Application No. JP 2016-138935 filed in the Japan Patent Office on Jul. 13, 2016. Each of the above-referenced applications is hereby incorporated herein by reference in its entirety.

TECHNICAL FIELD

The present disclosure relates to an image processing apparatus and an image processing method.

BACKGROUND ART

In related art, in one example, Patent Literatures 1 to 3 below disclose techniques of estimating an amount of lens shading using an image acquired by photographing a plurality of times while changing photographing conditions. Specifically, Patent Literature 1 discloses estimation of an amount of lens shading performed using an image having a difference in f-number, focal length, and presence or absence of flash light. In addition, Patent Literature 2 discloses estimation of an amount of lens shading performed using an image having a difference in F-number. In addition, Patent Literature 3 discloses estimation of an amount of lens shading performed using an image having a difference in exposure conditions.

CITATION LIST

Patent Literature

Patent Literature 1: JP 2004-088409A
Patent Literature 2: JP 2009-159093A
Patent Literature 3: JP 2015-128226A

DISCLOSURE OF INVENTION

Technical Problem

However, the techniques disclosed in Patent Literatures above are all necessary to perform photographing a plurality of times while changing photographing conditions and necessitate complicated operations for estimating the amount of lens shading. For this reason, the techniques disclosed in Patent Literatures above have problems that there are many constraints for estimating the amount of lens shading and so they are not being widely used.

On the other hand, in a lens-interchangeable camera system, in a case where the lens that is prepared in advance is attached to the camera body, the side of the camera body is capable of acquiring lens information such as an aperture value and a focal length by communication between the lens and the camera body. On the other hand, if an old type lens that is no longer in production is attached to the camera body, communication between the lens and the camera body fails to be performed, so the side of the camera body is difficult to estimate lens information such as an aperture value and a focal length. For this reason, a problem arises that appropriate processing corresponding to such lens information fails to be performed on the side of the camera body.

In view of this, it is desirable to be capable of estimating lens information with no change in photographing conditions.

Solution to Problem

According to the present disclosure, there is provided an image processing apparatus including: a positional displacement estimation unit configured to estimate positional displacement between a plurality of input images obtained by photographing an identical photographic subject; an alignment processing unit configured to align positions of the plurality of input images on the basis of the estimated positional displacement; and a lens information estimation unit configured to estimate lens information of a lens used to photograph the input image depending on a deterioration model indicating a deterioration component of the lens on the basis of the aligned input images.

In addition, according to the present disclosure, there is provided an image processing method including: estimating positional displacement between a plurality of input images obtained by photographing an identical photographic subject; aligning positions of the plurality of input images on the basis of the estimated positional displacement; and estimating lens information of a lens used to photograph the input image depending on a deterioration model indicating a deterioration component of the lens on the basis of the aligned input images.

Advantageous Effects of Invention

According to the present disclosure, it is possible to estimate lens information with no change in photographing conditions.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Overview of present disclosure
2. Exemplary configuration of camera system
3. Exemplary input image
4. Deterioration model
5. Alignment of plurality of images
6. Estimation of lens information
7. Correction processing based on lens information

[1. Overview of Present Disclosure]

Figure 1:
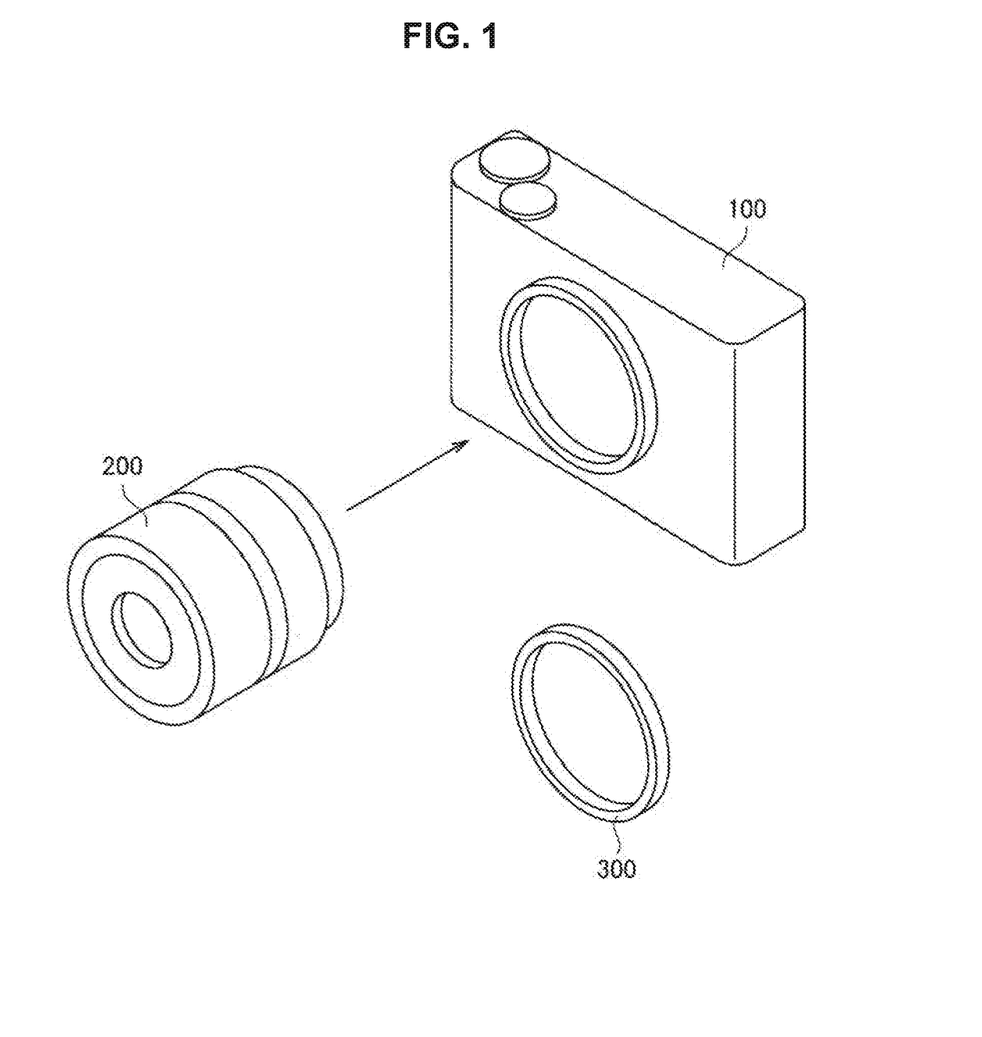
FIG. 1 is a schematic diagram illustrating a lens-interchangeable camera system.

The present disclosure relates to technology for automatically acquiring a state of a lens of a camera. FIG. 1 is a schematic diagram illustrating a lens-interchangeable camera system 1000. In this system 1000, a lens 200 is attachable to and detachable from a camera body 100. The user is able to select appropriately the lens 200 different in focal length or f-number, and to use it depending on the photographing situation.

A photographic subject image formed by the lens 200 is formed on an image-capturing plane of an image sensor (CMOS sensor, etc.) included in the camera body 100, and the image sensor photoelectrically converts the photographic subject image to acquire image data.

The data of the captured image is sometimes deteriorated due to factors such as luminance shading, color shading, or lens blur. It is possible to acquire characteristics of such deterioration factors in advance on the basis of design conditions of individual lenses 200, design conditions or states of the image sensor 105, or the like. Thus, the camera body 100 holds in advance the characteristics of these deterioration factors to perform processing for correcting the deterioration factors on the image data obtained by the image capturing. This makes it possible to obtain an image with high quality in which the deterioration factor is corrected.

On the other hand, the characteristics of deterioration factors vary depending on an aperture value (f-number) of the lens 200, a focal length, a focus distance, or the like. For this reason, the characteristics of deterioration factors corresponding to lens information such as an aperture value (f-number), a focal length, and a focus distance are held on the side of the camera body 100. Then, the lens information such as the aperture value (f-number), focal length, and focus distance of the lens 200 is acquired at the time of photographing, and the correction based on deterioration characteristics corresponding to the acquired lens information is performed on the side of the camera body 100. This makes it possible to optimize a correction condition depending on photographing conditions, thereby obtaining a high-definition image.

The side of the camera body 100 can easily acquire the lens information such as the aperture value, focal length, and focus distance on the assumption that the lens 200 and the camera body 100 can communicate with each other. On the other hand, even in a situation where the lens 200 and the camera body 100 fail to communicate with each other, it is assumed that the user attaches a desired lens 200 to the camera body 100 to perform photographing. This is because that just a photographing is possible using the lens 200 that can be attached to the camera body 100 but there is sometimes a request to attach a lens 200, which is released in the past and is no longer in production or is manufactured by a manufacturer different from the manufacturer of the camera body 100. In such a case, a mount corresponding to the lens 200 is provided on the side of the lens, and an adapter 300 in which a mount corresponding to the camera body 100 is provided on the side of the camera body is attached, so this makes it possible to attach the lens 200 to the camera body. However, even in the case where attachment is achieved through the adapter 300, it is generally difficult for the lens 200 and the camera body 100 to communicate with each other, and the side of the camera body 100 is difficult to acquire the lens information. In consideration of such a situation, an embodiment according to the present disclosure provides a system allowing the side of the camera body 100 to estimate the lens information such as the aperture value (f-number), focal length, and focus distance. This will be described below in detail.

[2. Exemplary Configuration of Camera System]

Figure 2:
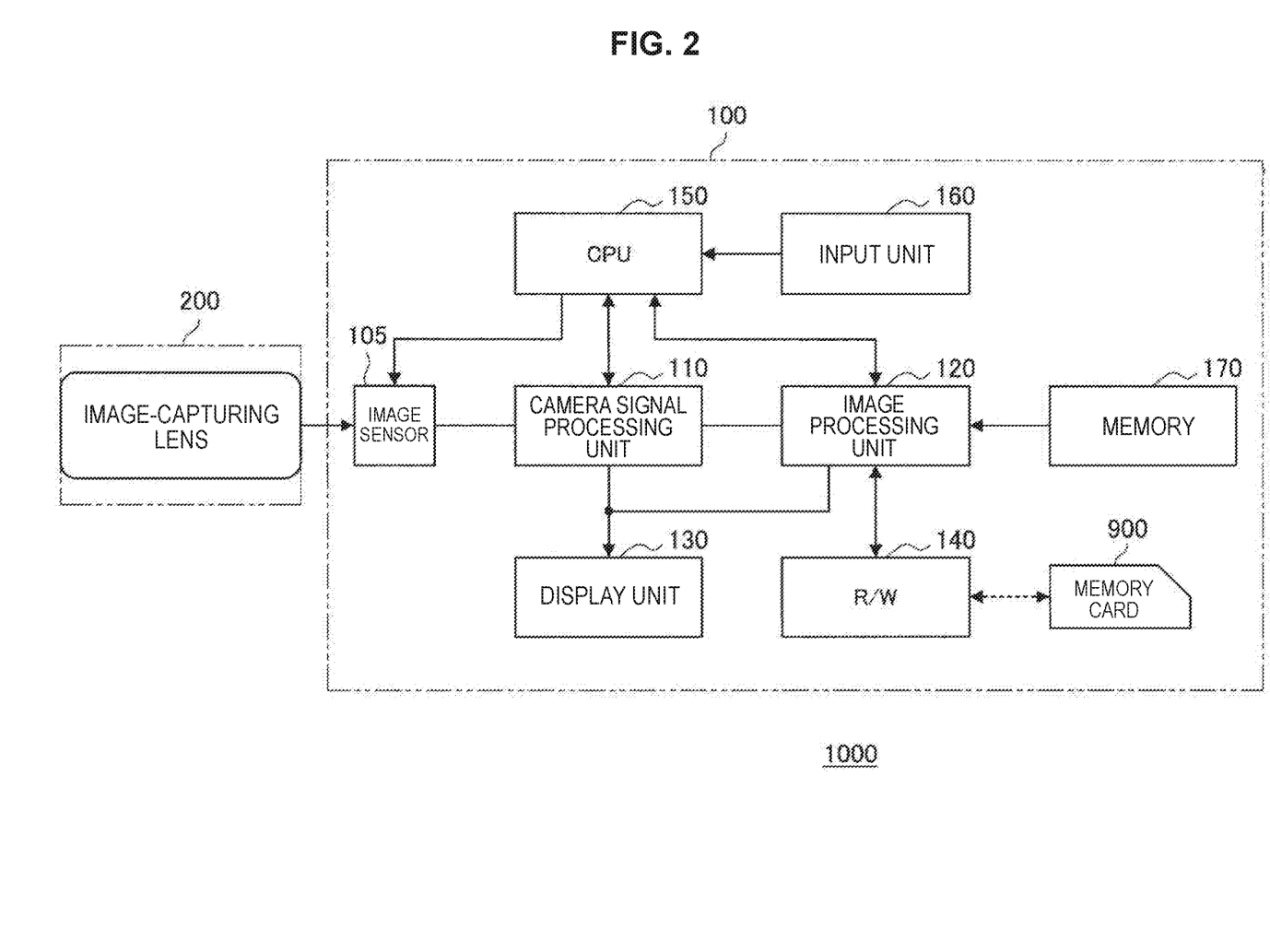
FIG. 2 is a block diagram illustrating a configuration of the camera system according to the present embodiment.

FIG. 2 is a block diagram illustrating the configuration of the camera system 1000 according to the present embodiment. The camera system 1000 includes the camera body 100 and the lens 200. The camera body 100 includes an image sensor 105, a camera signal processing unit 110 that performs signal processing such as analog-digital conversion of a captured image signal, and an image processing unit 120 that performs recording and reproducing processing or the like of an image signal. In addition, the camera body 100 includes a display unit 130 that displays a captured image or the like, such as a liquid crystal display (LCD), a reader/writer (R/W) 140 that writes and reads an image signal to and from a memory card 900, a central processing unit (CPU) 150 that controls the entire image capturing apparatus, an input unit 160 having various switches or the like for performing a predetermined operation by a user, and a memory 170 that previously stores a deterioration model. The image sensor 105 includes a charge-coupled device (CCD), a complementary-metal-oxide semiconductor (CMOS), or the like.

The lens 200 includes an optical system having an image-capturing lens, a diaphragm mechanism, a zoom mechanism, a focus mechanism, or the like. In the present embodiment, the lens information of the lens 200 can be estimated on the side of the camera body 100 without communication between the lens 200 and the camera body 100 as long as the lens 200 can be attached to the camera body 100.

The camera signal processing unit 110 performs various kinds of signal processing such as conversion into digital signals, noise reduction, image quality correction, conversion into luminance and color difference signal, or the like on an output signal from the image sensor 105. The image processing unit 120 performs compression encoding and decompression decoding processing, conversion processing of data specification such as resolution, or the like on an image signal based on a predetermined image data format.

The display unit 130 has a function of displaying various kinds of data such as states of user's operation on the input unit 160, a captured image, or the like. The R/W 140 writes the image data encoded by the image processing unit 120 to the memory card 900 and reads the image data recorded in the memory card 900. The memory card 900 is, in one example, a semiconductor memory detachable from a slot connected to the R/W 140.

The CPU 150 functions as a control processing unit for controlling the respective circuit blocks provided in the camera body 100, and controls the respective circuit blocks on the basis of an instruction input signal or the like from the input unit 160. The input unit 160 includes, in one example, a shutter-release button used to perform a shutter operation, a selection switch used to select an operation mode, or the like, and outputs the instruction input signal in response to an operation by the user to the CPU 150.

During photographing standby, the image signal captured by the image sensor 105 is output to the display unit 130 via the camera signal processing unit 110 and displayed as a through-the-lens image under the control of the CPU 150. The input unit 160 receives information indicating the type of the lens 200 (manufacturer name, product type, specification information, etc.) as an input.

When photographing is performed in response to the instruction input signal from the input unit 160, the image signal photographed by the image sensor 105 is output from the camera signal processing unit 110 to the image processing unit 120, is subject to the compression encoding processing, and is converted into digital data of a predetermined data format. The converted data is output to the R/W 140 and is written to the memory card 900.

[3. Exemplary Input Image]

Figure 3:
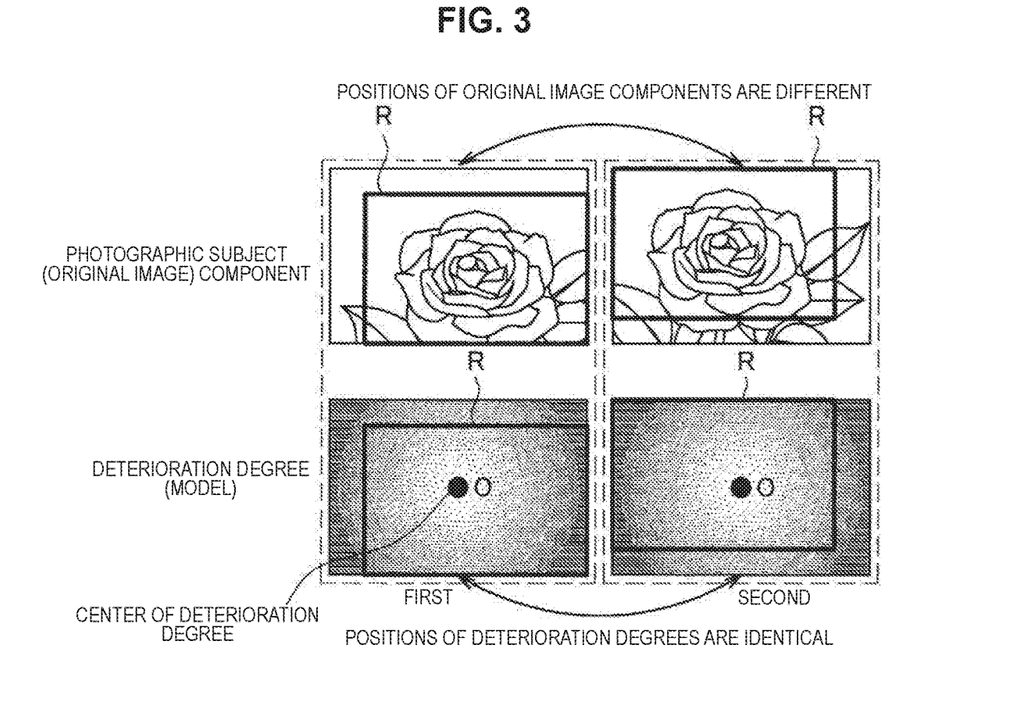
FIG. 3 is a schematic diagram illustrated to describe a target input image in the present embodiment.

FIG. 3 is a schematic diagram illustrated to describe a target input image in the present embodiment. In the present embodiment, two or more images captured by shifting the position of the camera body 100 are taken as input images. In these images, the photographed subjects are the same but there is slight positional displacement between the images. In this event, it is assumed in each image that image-capturing deterioration having different intensities in a screen occurs.

In one example, in a case where the camera body 100 has a continuous photographing function, two or more images photographed by continuous photographing can be taken as input images. In addition, even in a case where the camera body 100 does not have the continuous photographing function, two or more images photographed while shifting the orientation of the camera body 100 and the lens 200 can be taken as input images. Two or more images temporally adjacent to each other among a plurality of images photographed in time series are preferable to be taken as input images.

FIG. 3 illustrates the image information separately showing as a picture component (original image component) and a deterioration component (deterioration degree) of a photographic subject for each of the first image and the second image. The original image component is image information corresponding to a target photographic subject. On the other hand, the deterioration component is the deterioration degree caused by the optical system of the lens 200. Moreover, the image sensor 105 acquires image information on which the original image component and the deterioration component are superimposed. The deterioration degree illustrated in FIG. 3 is included in the input image obtained by the image capturing. However, the deterioration component can be acquired in advance on the basis of the design conditions, status, or the like of the lens 200 or the image sensor 105 as described above, so it is also stored in the memory 170 of the camera body 100 as a deterioration model.

The image indicating the deterioration component in FIG. 3 represents that the lower the density, the weaker the deterioration intensity but the higher the density, the stronger the deterioration intensity, and represents how the deterioration intensity varies depending on positions in the screen. In other words, the deterioration intensity is weak at the center O of the deterioration degree, and the deterioration intensity becomes stronger toward the periphery of the image.

Moreover, FIG. 3 exemplifies a case where the deterioration degree varies concentrically from the center O as the deterioration component. However, even in the case where the lens 100 has characteristics of the deterioration degree asymmetric to the center O, the case where the lens 200 has characteristics of a one-sided blur, or other similar cases, the deterioration model allowed to be held in the camera body 100 makes it possible for the present embodiment to be applicable, irrespective of distribution of the deterioration degrees.

As illustrated in FIG. 3, in the case where the first and second images are photographed with their positions displaced from each other, displacement occurs in the position of the original image component between the images. On the other hand, the deterioration component depends on characteristics of the lens 200, so the same deterioration characteristics occur at the same position in the image. Moreover, the deterioration component is image-capturing deterioration that may be caused depending on the state of the image-capturing device 105 of the camera body 100 or the lens 200, and the deterioration component is targeted for that having different deterioration intensities in the screen.

[4. Deterioration Model]

The deterioration model according to the present embodiment is shown as a model indicating the deterioration degree illustrated in FIG. 3. This deterioration model is a numerical representation of coordinates on the screen of the image and the deterioration component corresponding to the coordinates. The deterioration component corresponding to the coordinates varies depending on the lens information such as the aperture value, focal length, and focus position. Thus, the deterioration model includes a multidimensional map that prescribes the relationship between the coordinates, the deterioration component, and the lens information.

Figure 5:
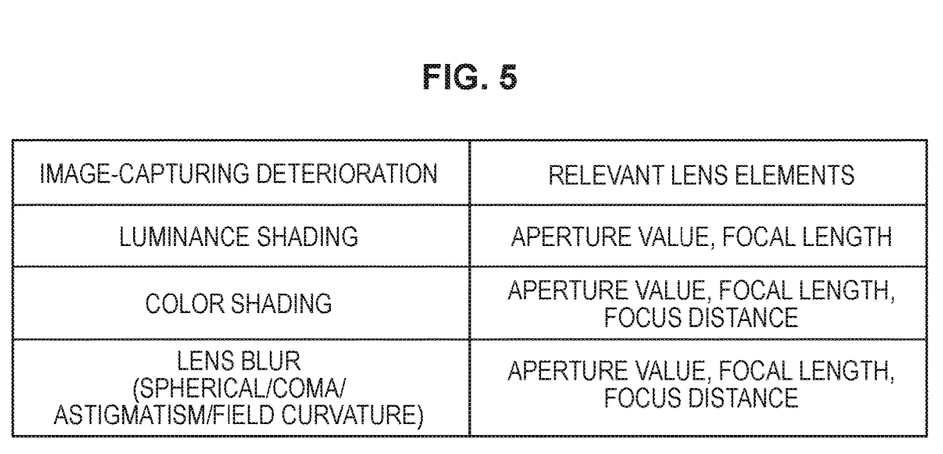
FIG. 5 is a schematic diagram illustrating a state in which the first image and the second image are aligned to coincide with each other from the state in FIG. 3.

FIG. 5 is a schematic diagram illustrating the types of deterioration components and the element (lens information) of the lens 200 related to each deterioration component. Specific examples of types of deterioration components include luminance shading, color shading, and lens blur. The lens blur includes coma aberration, astigmatism, spherical aberration, field curvature, or the like. As illustrated in FIG. 5, these deterioration components (image-capturing deterioration illustrated in FIG. 5) have their intensities varied depending on the lens elements (lens information such as the aperture value, focal length, and focus distance) at the time of photographing. In addition, the deterioration component affects brightness, color, sharpness, and contrast of the image, but does not affect a phase of the image. In the present embodiment, for these deterioration components, the deterioration intensity corresponding to the image sensor 12 of the camera body 100 or the lens 200 used for photographing is used as the deterioration model. The deterioration model prescribes the relationship between the deterioration intensity, the coordinates in the screen, and the lens information, and is stored in the memory 170 included in the camera body 100 in advance.

As illustrated in FIG. 5, in the case of luminance shading, the aperture value and the focal length are related to the deterioration intensity as the lens information. For this reason, in the case of luminance shading, a deterioration model in which the deterioration intensity is determined for the two axes of the aperture value and the focal length is constructed. Likewise, in the case of color shading, a deterioration model in which the deterioration intensity is determined for three axes of the aperture value, the focal length, and the focus distance is constructed.

In the lens elements illustrated in FIG. 5, the aperture value is related to the exit pupil diameter, the focal length and the focus distance are related to the exit pupil distance, the aperture value varies in conjunction with the exit pupil diameter, and the focal length and the focus distance vary in conjunction with the exit pupil distance. Thus, the aperture value, the focal length, the focus distance, the exit pupil diameter, and the exit pupil distance are preferably associated with each other as parameters of the deterioration model.

[5. Alignment of Plurality of Images]

Figure 4:
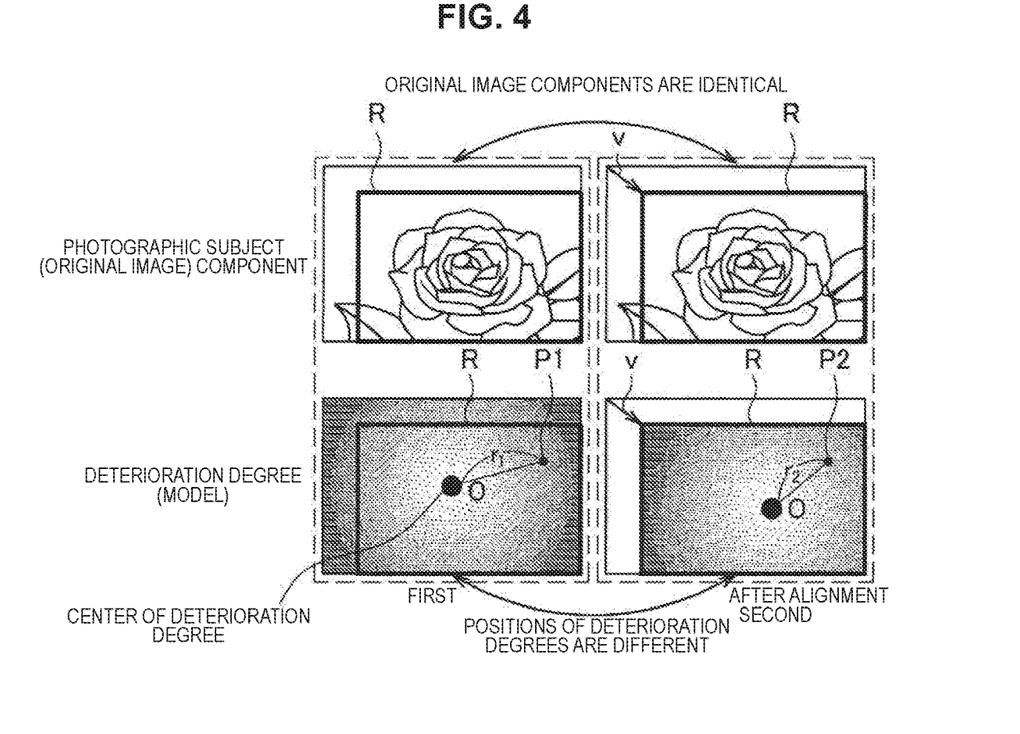
FIG. 4 is a schematic diagram illustrating types of deterioration components and elements (lens information) of a lens related to each deterioration component.

FIG. 4 is a schematic diagram illustrating a state in which the first image and the second image are aligned to coincide with each other from the state in FIG. 3. As illustrated in FIG. 3, at the time of alignment, first, a region R common to the first and second original image components is cut out. Then, as illustrated in FIG. 5, the second image is moved to the first image in the lower right direction by a positional displacement vector v, the regions R are made to coincide with each other, thereby making the photographic subject position of the first image to coincide with the photographic subject position of the second image. In this way, when the alignment between the first image and the second image is performed, the positions of the original image components of the two images coincide with each other, and the position where the deterioration component occur is displaced. Similarly, for the deterioration model illustrated in FIG. 3, the deterioration model corresponding to the second image is moved to the deterioration model corresponding to the first image in the lower right direction by the displacement vector v, so the deterioration model corresponding to the first image and the deterioration model corresponding to the second image are prepared.

Thus, after the alignment illustrated in FIG. 5, although the original image components coincide, two captured images having different deterioration degrees are obtained. If two images having such characteristics are obtained, it is possible to obtain the lens information by canceling the original image component from both images and comparing it with the deterioration models subject to the same alignment.

[6. Estimation of Lens Information]

In the present embodiment, the lens information such as the aperture value, focal length, and focus distance is estimated from the two images after the alignment as described above. The basic principle of estimation is now described. In the deterioration degree model after the alignment illustrated in FIG. 5, the deterioration degree is determined on the basis of the coordinates in the screen and the lens information. Here, the description is given of a focal length f of the lens information as an example. It is assumed that a model prescribing the relationship between the deterioration degree and the focal length f and the distance r from the center O is held on the side of the camera body 100 in advance. Here, assuming that the deterioration increases depending on the distance from the center O of the deterioration degree, the parameter representing the coordinates can be the distance r (image height) from the center O. Thus, a deterioration model M can be M (f,r) as a function of the focal length f and the distance r. In this case, assuming that the original image component is set to I and the actual deterioration degrees at points $P_1$ and $P_2$ obtained by image capturing are set to $n_1$ and $n_2$, respectively, the following Formulas (1) and (2) are established. Moreover, the distance $r_1$ is the distance from the center O to the point $P_1$, and the distance $r_2$ is the distance from the center O to the point $P_2$.

$$I \times n_1 = M(f, r_1) \qquad (1)$$

$$I \times n_2 = M(f, r_2) \qquad (2)$$

The left sides of Formulas (1) and (2) are determined from the input image obtained by image capturing. In addition, the original image component I can be deleted by dividing both sides of Formulas (1) and (2). Thus, it is possible to calculate the focal length f on the basis of the deterioration model prescribing the relationship between the deterioration degree and the focal length f and the distance r from the center O with the focal length f as an unknown. Specifically, when dividing both sides of Formulas (1) and (2), the left side is a value obtained by image capturing and the right side is obtained from the deterioration model, so it is possible to obtain the focal length f so that the left side and the right side coincide with each other. It is also possible to calculate the aperture value and the focus distance using the similar method. Moreover, a method of obtaining lens information by cost calculation so that the values of the left side and the right side after the division are minimized will be described later.

As illustrated in FIG. 4, in one example, when it is assumed that the deterioration component is luminance shading, the aperture value and the focal length are involved as the lens information. In this case, it is also possible to calculate the aperture value and the focal length by comparison with the deterioration model in which the deterioration intensity is determined for the two axes of the aperture value and the focal length.

Figure 6:
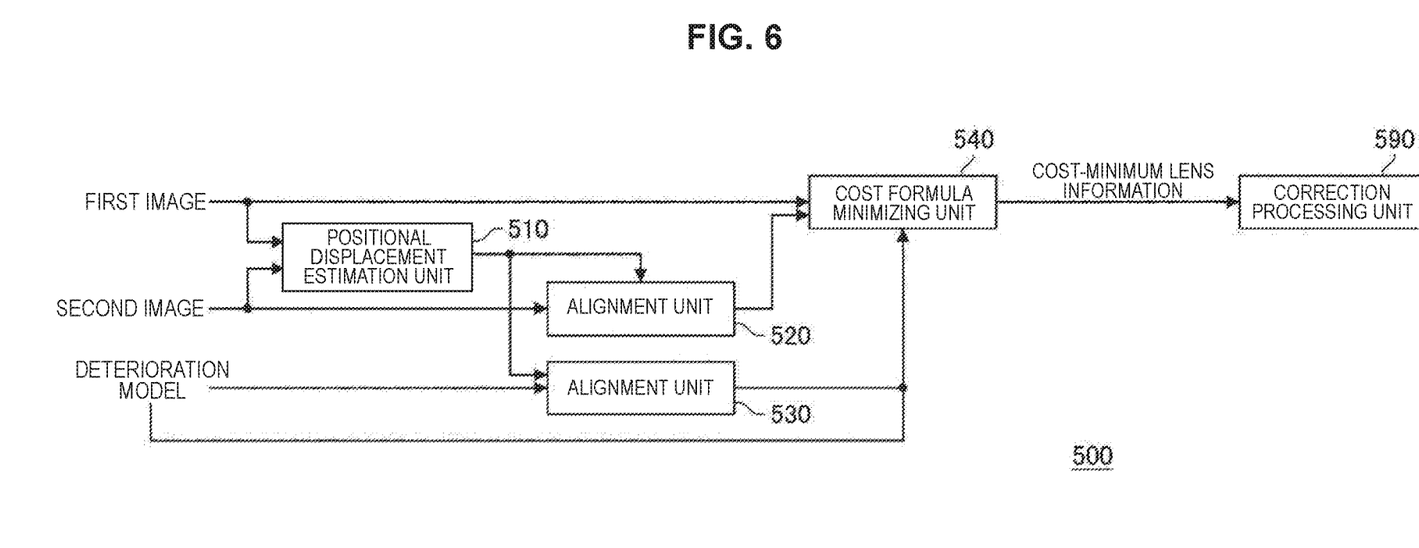
FIG. 6 is a schematic diagram illustrating a basic configuration of an image processing apparatus according to the present embodiment.

The estimation of the lens information using the method described above is now described in detail. FIG. 6 is a schematic diagram illustrating a basic configuration of an image processing apparatus 500 according to the present embodiment. The configuration illustrated in FIG. 6 is provided in the camera signal processing unit 110 or the image processing unit 120 in FIG. 2. As illustrated in FIG. 6, the image processing apparatus 500 includes a positional displacement estimation unit 510, an alignment unit 520, an alignment unit 530, a cost formula minimizing unit (lens information estimation unit) 540, and a correction processing unit 590. The respective constituent components illustrated in FIG. 6 can include a circuit (hardware) or a central processing unit such as CPU and a program (software) for making it function. In FIG. 6, some components can be configured as hardware, and the rest can be configured as software. In one example, the correction processing unit 590 can be configured as hardware, and the remaining components can be configured as software.

The positional displacement estimation unit 510 first receives data of the first image and the second image as an input. The positional displacement estimation unit 510 calculates an amount of positional displacement between the first image and the second image. The alignment unit 520 then performs processing for aligning the position of the second image with that of the first image using the displacement vector v (see FIG. 4) obtained from the amount of positional displacement. The alignment here can be achieved using a method such as block matching for each small area of the image. The aligned second image is input to the cost formula minimizing unit 540.

The alignment unit 530 receives a deterioration model as an input. The alignment unit 530 aligns the position of a deterioration model indicating the degree of image-capturing deterioration using the positional displacement vector v obtained from the amount of positional displacement. This allows the position of the deterioration model to be set to a position corresponding to the second image. The aligned deterioration model is input to the cost formula minimizing unit 540.

Further, the cost formula minimizing unit 540 directly receives the first image as an input. In addition, the cost formula minimizing unit 540 receives a deterioration model that is not subject to the alignment as an input. This deterioration model corresponds to the first image.

The cost formula minimizing unit 540 calculates the lens information by minimizing a cost formula obtained by setting the degradation degree obtained from the two images and the mean squared error of the deterioration model as a cost by using the first image, the aligned second image, the deterioration model, and the aligned deterioration model, which are obtained so far. In this way, the cost formula minimizing unit 540 functions as the lens information estimation unit that estimates lens information.

The description is given of a phenomenon in which the deterioration is expressed by gain processing on an original image, such as luminance shading or color shading, as a deterioration target. The luminance shading or color shading (hereinafter collectively referred to as shading) having different intensities causes the brightness or color of the image to make different. The appropriate alignment between such images can be achieved by allowing the positional displacement estimation unit 510 to use an evaluation index of block matching, which is strong in level variation, performed for each small area of the image. Examples of the evaluation index of matching, which is strong in level variation, include zero mean normalized cross-correlation (ZNCC) or the like.

The cost formula minimizing unit 540 uses a cost formula to estimate the lens information. The shading image is expressed by the integration of the original image component and the shading gain, so if the two images of the second image and the first image obtained by the alignment in the alignment unit 520 are divided, the original image component is canceled, and only a component of the shading having the phase displacement remains. Assuming that the original image component is set to I(x,y) and the shading gain model when the lens information is p is set to S(x,y,p), Formula (3) below is established. In Formula (3), (x,y) represents coordinates on the image, (Δx,Δy) represents the positional displacement vector v of the first image relative to the second image, and p is the lens information relating to shading, for example, exit pupil distance or exit pupil diameter, and is preferably an aperture value or a focal length.

[Math. 1]

$$\frac{I(x, y) * S(x, y, p)}{I(x, y) * S(x+\Delta x, y+\Delta y, p)} = \frac{S(x, y, p)}{S(x+\Delta x, y+\Delta y, p)} \quad (3)$$

The difference between both sides in Formula (3) is taken as an error between the photographed image and the model, and this error is minimized as a cost, which is shown in Formula (4). The noise included in the actual photographed image is set to n, the image size is set to M×N, and the square mean of the difference between both sides in Formula (3) is calculated as the error. This makes it possible to obtain the lens information p.

[Math. 2]

$$\hat{p} = \underset{p}{\mathrm{argmin}} \left[ \frac{1}{M \times N} \sum_{c=\{r,gr,gb,b\}} \sum_{x,y} \left\| \frac{I(x, y) * S(x, y, \hat{p}) + n}{I(x, y) * S(x+\Delta x, y+\Delta y, \hat{p}) + n} - \frac{S(x, y, p)}{S(x+\Delta x, y+\Delta y, p)} \right\|^2 \right] \quad (4)$$

When calculating Formula (4) using the actual image, division is performed between the images, in some cases, division by zero can occur depending on the picture, thereby making the estimation result unstable. In order to avoid this, the calculation can be performed by transforming Formula (4) to Formula (5).

[Math. 3]

$$\hat{p} = \underset{p}{\mathrm{argmin}} \left[ \frac{1}{MN} \sum_{c=\{r,gr,gb,b\}} \sum_{x,y} \|f(x, y, p)\|^2 \right] f(x, y, p) = \quad (5)$$

$$\frac{\{I(x, y) * S(x, y, \hat{p}) + n\} \times \{S(x+\Delta x, y+\Delta y, p)\} - \{I(x, y) * S(x+\Delta x, y+\Delta y, \hat{p}) + n\} \times \{S(x, y, p)\}}{\{I(x, y) * S(x+\Delta x, y+\Delta y, \hat{p}) + n\} \times \{S(x+\Delta x, y+\Delta y, p)\}}$$

If there is a difference in luminance level between two images that are used for input when evaluating the error by the equation shown in Formula (3), appropriate evaluation fails to be performed in some cases. In the exemplary configuration illustrated in FIG. 7, in order to avoid this, a luminance level adjustment unit 550 is provided in the stage preceding the cost formula minimizing unit 540. The luminance level adjustment unit 550 adjusts the luminance of the second image aligned with the first image. The adjustment of luminance is preferably performed by comparing luminance of both images or performed on the basis of a difference in photographing conditions of both images at the time of photographing.

Figure 8:
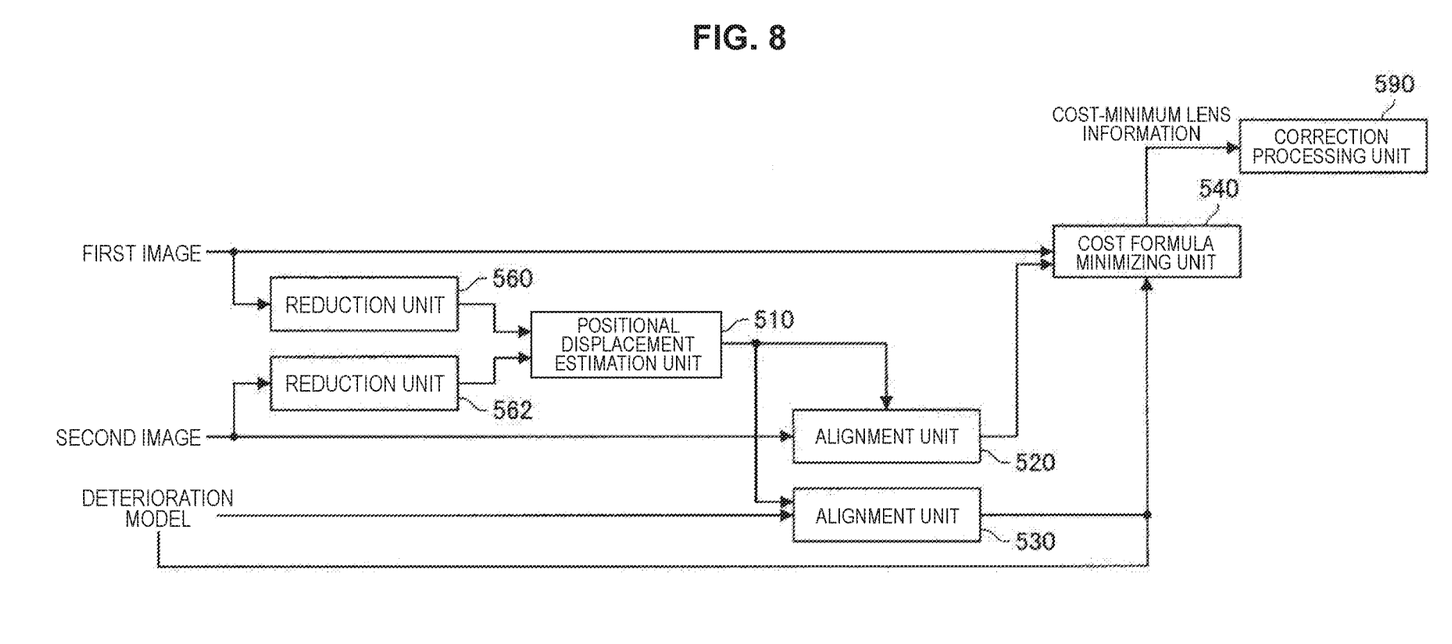
FIG. 8 is a schematic diagram illustrating an example in which a reduction unit is provided in a stage preceding a positional displacement estimation unit.

FIG. 8 is a schematic diagram illustrating an example in which reduction units 560 and 562 are provided in the stage preceding the positional displacement estimation unit 510. In the case of an image in which the first image and the second image are blurred, the block matching by the positional displacement estimation unit 510 is hindered in some cases. The reduction units 560 and 562 reduce the first image and the second image to increase the definition of the image, thereby increasing the accuracy of the block matching by the positional displacement estimation unit 510. In the case where the deterioration target is a blur aberration such as coma aberration, astigmatism, spherical aberration, or field curvature (hereinafter collectively referred to as aberration), these phenomena can be expressed as deterioration by convolution processing on the original image. These aberrations having different intensities cause the degrees of aberration of the image to be different. In order to achieve appropriate alignment between such images, the reduction of the two images used for the estimation input before the positional displacement estimation by the positional displacement estimation unit 510 makes it possible to reduce the influence of aberration in performing the block matching.

In the case of the configuration illustrated in FIG. 8, the positional displacement estimation unit 510 obtains the positional displacement between the first image and the second image on the basis of the reduced image. For this reason, the positional displacement estimation unit 510 obtains the positional displacement between the first and second images before reduction in consideration of the reduction ratio in the reduction units 560 and 562. This makes it possible for the alignment units 520 and 530 to perform the alignment on the basis of the positional displacement between the first and second images before reduction.

The aberration image is represented by a convolution integral of an original image component and a blur function (point spread function (PSF)) representing the degree of aberration. The cost formula minimizing unit 540 in FIG. 8 performs division in the frequency domain on the two images of the second image obtained by alignment in the alignment unit 520 and the first image that is directly input, so cancels the original image component as in the case of FIGS. 6 and 7. The amplitude component and the phase component will be separated in the frequency domain, so the image is divided into small areas to the extent that it can be assumed that the degree of aberration is the same, and division is performed in the frequency domain for each small area. If the amplitude component in the frequency domain of the original image divided into the small areas is set to $I_i'(\xi,\eta)$ and a PSF model at the small area number i when the lens information is p is set to $S_i'(\xi,\eta,p)$, is can be represented as in Formula (6). In Formula (6), $(\xi,\eta)$ represents the coordinates in the frequency domain, i represents the position number of the divided small area, and i+Δi represents the position number of the small area in consideration of the alignment amount of the second image.

[Math. 4]

$$\frac{I_i'(\xi,\eta) * S_i'(\xi,\eta,p)}{I_i'(\xi,\eta) * S_{i+\Delta i}'(\xi,\eta,p)} = \frac{S_i'(\xi,\eta,p)}{S_{i+\Delta i}'(\xi,\eta,p)} \quad (6)$$

Figure 7:
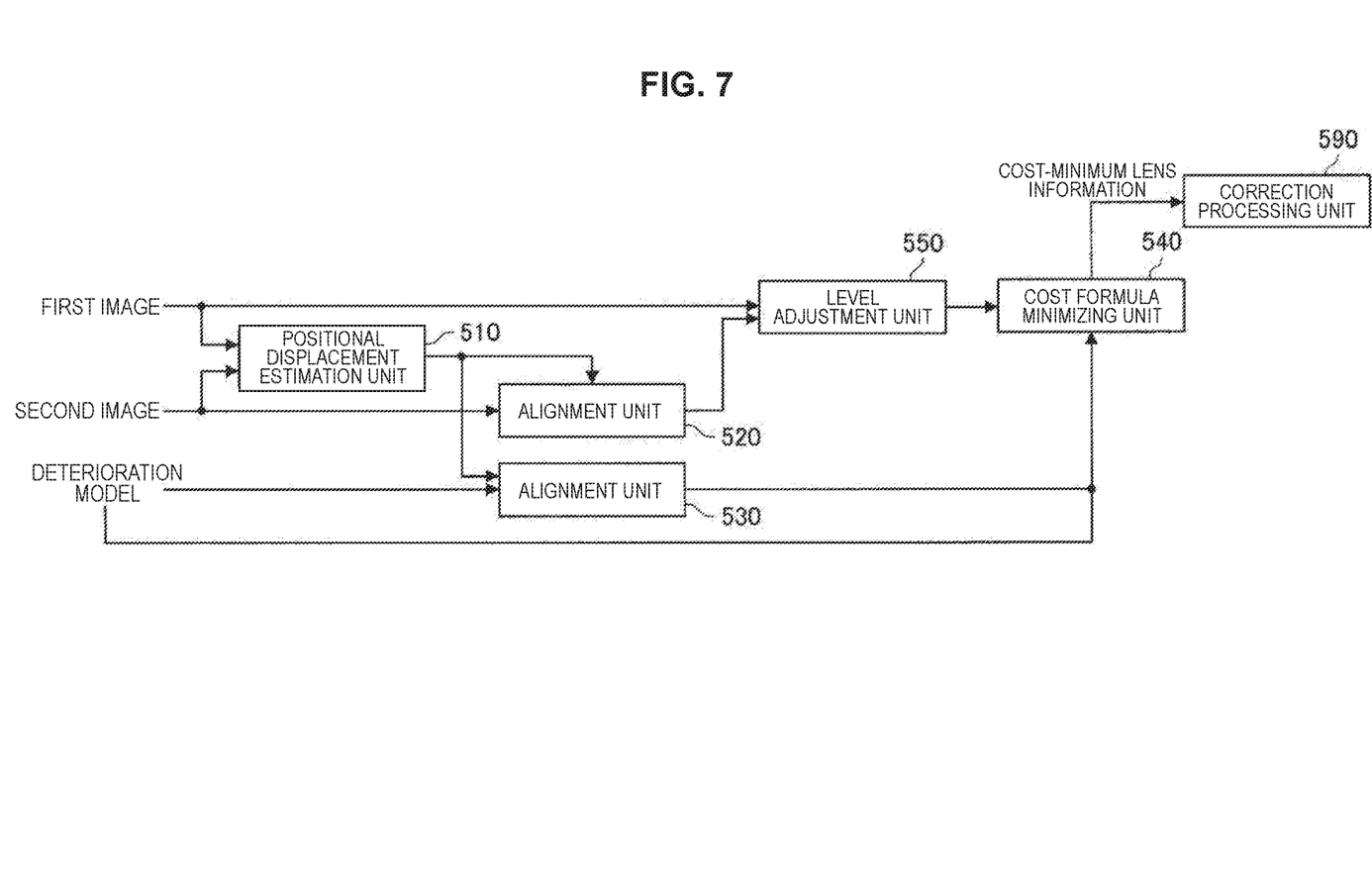
FIG. 7 is a schematic diagram illustrating an example in which a luminance level adjustment unit is provided in a stage preceding a cost formula minimizing unit.

As in the case of FIGS. 6 and 7, if the difference between both sides in Formula (6) is set as an error and the error with respect to the entire area of the image is set as a cost, it is possible to obtain the lens information p that minimizes the cost.

Figure 9:
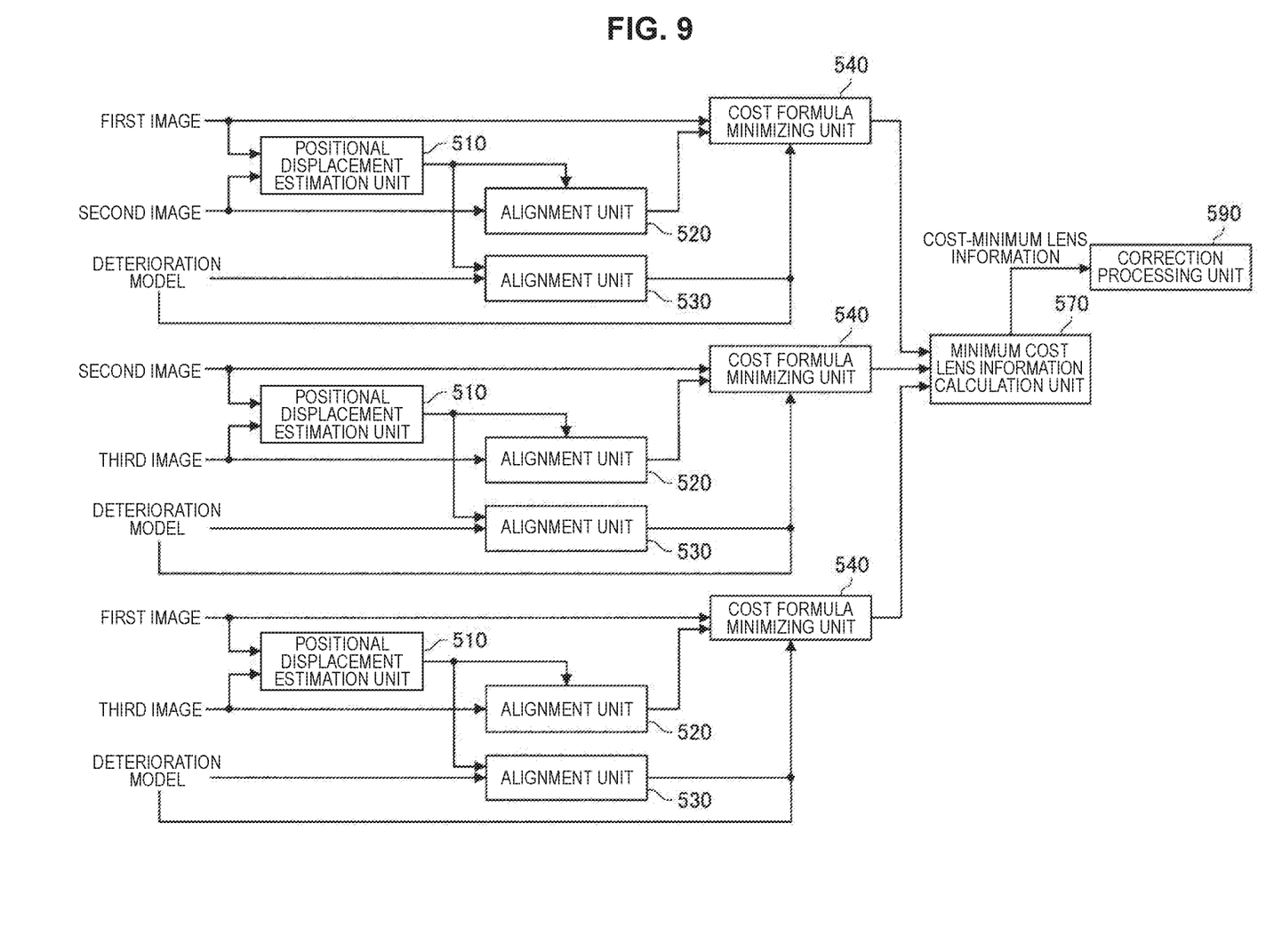
FIG. 9 is a schematic diagram illustrating a configuration for processing in a case of three input images.

In the exemplary configuration described above, the number of input images is two, but the number of input images can be set to three or more to further enhance the accuracy of processing. In a case where the number of input images are three or more, the number of combinations of images to which the processing corresponding to the configuration described above is applicable increases, thereby increasing the estimation accuracy. FIG. 9 is a schematic diagram illustrating a configuration for processing in the case where the input images are three. The processing for each of three combinations of a combination between the first and second images, a combination between the second and third images, and a combination between the first and third images, is performed by the positional displacement estimation unit 510, the alignment unit 520, the alignment unit 530, and the cost formula minimizing unit 540. A minimum cost lens information calculation unit 570 compares minimum cost values in each combination, and sets the lens information when the cost is the smallest as a final estimation result. In this case, the minimum cost lens information calculation unit 570 functions as the lens information estimation unit together with the cost formula minimizing unit 540. The cost itself is the evaluation of an error between the image obtained by image capturing and the deterioration model, and the estimation result of the combination with the smallest value is the result with the highest accuracy.

Figure 10:
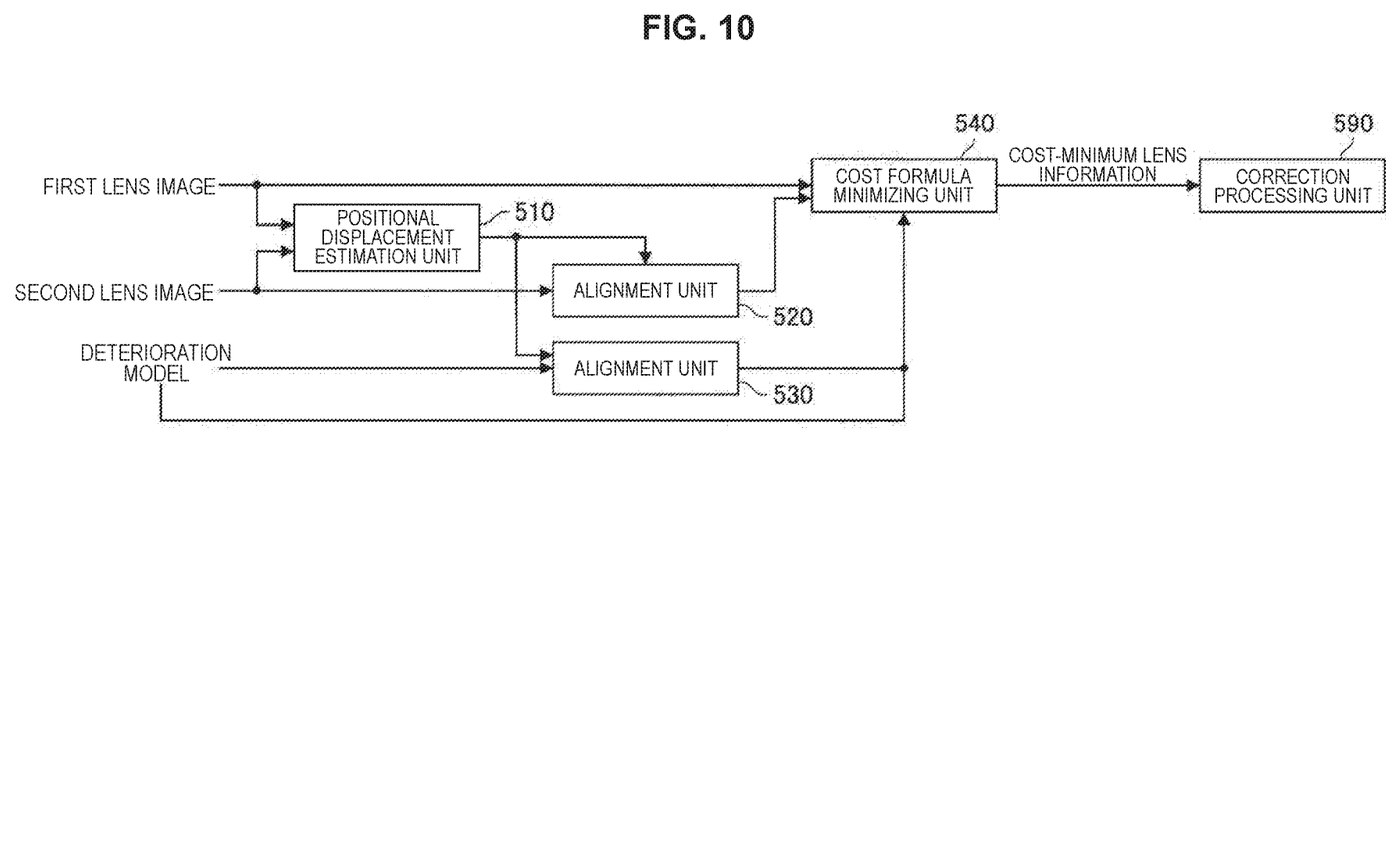
FIG. 10 is a schematic diagram illustrating an example of acquiring an input image from a first lens and a second lens.

Further, in the exemplary configuration described above, although the case where a plurality of input images are acquired in time series is described, a plurality of input images are preferably photographed simultaneously by a plurality lenses. FIG. 10 is a schematic diagram illustrating an example of acquiring input images from a first lens and a second lens. The first lens and the second lens can be, in one example, respectively, a lens for a left-eye image and a lens for a right-eye image that are used to photograph a stereoscopic image (3D image). FIG. 8 illustrates an example of the binocular configuration having two lenses, but it is applicable to a triple or more configuration having three or more lenses. As described above, according to the present embodiment, it is possible to estimate lens information on the basis of a plurality of input images temporally or spatially displaced.

[7. Correction Processing Based on Lens Information]

When the lens information is obtained as described above, the correction processing unit 590 performs correction processing of the photographed image on the basis of the lens information. The deterioration model prescribes the relationship between the deterioration component, the coordinates, and the lens information, so if the lens information is obtained, it is possible to obtain the deterioration component at each coordinate in the image. The correction processing unit 590 calculates the deterioration component from the deterioration model on the basis of the lens information and corrects the image on the basis of the deterioration component. This makes it possible to reliably correct the deterioration component caused by the characteristics of the lens 200 even in the case where the lens 200 that fails to communicate with the camera body 100 is attached, thereby obtaining a captured image of high image quality.

According to the present embodiment as described above, the use of images continuously photographed or images photographed with camera modules having the same configuration makes it possible to estimate the lens condition at the time of photographing without constraints such as change of image-capturing conditions to estimate the lens information and use of a special-purpose image-capturing device. Thus, it is possible to correct the deterioration degree caused by the lens or the image sensor of the camera using the estimated lens information.

Thus, even in the case where the user uses a camera module allowing the user to freely combine parts, for example, the case where an old type lens is attached to a lens-interchangeable camera via a mount adapter or the case where a lens is attached to a camera of a smartphone with an attachment, it is possible to estimate the lens information with high accuracy. This makes it possible to optimally perform the processing for correction of image-capturing deterioration.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:
a positional displacement estimation unit configured to estimate positional displacement between a plurality of input images obtained by photographing an identical photographic subject;
an alignment processing unit configured to align positions of the plurality of input images on the basis of the estimated positional displacement; and
a lens information estimation unit configured to estimate lens information of a lens used to photograph the input image depending on a deterioration model indicating a deterioration component of the lens on the basis of the aligned input images.

(2)

The image processing apparatus according to (1),
in which the alignment processing unit includes
a first alignment unit configured to align positions of original image components of the plurality of input images on the basis of the positional displacement, and
a second alignment unit configured to align positions of the deterioration models corresponding to the plurality of input images on the basis of the positional displacement.

(3)

The image processing apparatus according to (1) or (2),
in which the lens information estimation unit estimates the lens information by comparing a deterioration degree of the input image and the deterioration model, the deterioration degree being obtained by canceling an original image component from the plurality of input images.

(4)

The image processing apparatus according to (3),
in which the lens information estimation unit estimates the lens information in such a way to minimize a difference between the deterioration degree of the input image and the deterioration model.

(5)

The image processing apparatus according to any of (1) to (4),
in which the deterioration model is a model prescribing deterioration of the image depending on the lens information and a position in the image.

(6)

The image processing apparatus according to any of (1) to (5),
in which the deterioration component is a characteristic of luminance shading, color shading, or aberration.

(7)

The image processing apparatus according to any of (1) to (6),
in which the lens information is an aperture value, a focal length or a focus distance, or an exit pupil diameter or an exit pupil distance.

(8)

The image processing apparatus according to any of (1) to (7), including:
a correction processing unit configured to correct a photographed image on the basis of the lens information and the deterioration model.

(9)

The image processing apparatus according to any of (1) to (8),
in which the alignment unit aligns the positions of the input images using block matching.

(10)

The image processing apparatus according to any of (1) to (9), including:
a luminance level adjustment unit configured to adjust luminance of the plurality of aligned input images.

(11)

The image processing apparatus according to any of (1) to (10), including:
a reduction unit configured to reduce the plurality of input images,
in which the positional displacement estimation unit estimates the positional displacement on the basis of the plurality of reduced input images.

(12)

The image processing apparatus according to any of (1) to (11),
in which the lens information estimation unit
estimates, with respect to the three or more input images, the lens information for the input images of a plurality of aligned combinations, and
estimates lens information that minimizes a difference from the deterioration model among pieces of the lens information estimated for the plurality of combinations.

(13)

An image processing method including:
estimating positional displacement between a plurality of input images obtained by photographing an identical photographic subject;
aligning positions of the plurality of input images on the basis of the estimated positional displacement; and
estimating lens information of a lens used to photograph the input image depending on a deterioration model indicating a deterioration component of the lens on the basis of the aligned input images.

REFERENCE SIGNS LIST 100 camera body
200 lens
500 image processing apparatus
510 positional displacement estimation unit 510
520, 530 alignment unit
540 cost formula minimizing unit
550 luminance level adjustment unit
560, 562 reduction unit
570 minimum cost lens information calculation unit
590 correction processing unit

The invention claimed is:

1. An image processing apparatus comprising:
a positional displacement estimation unit configured to estimate positional displacement between a plurality of input images obtained by photographing an identical photographic subject;
an alignment processing unit configured to align positions of the plurality of input images on a basis of the estimated positional displacement; and
a lens information estimation unit configured to estimate lens information of a lens used to photograph an input image depending on a deterioration model indicating a deterioration component of the lens on a basis of the plurality of aligned input images.

2. The image processing apparatus according to claim 1, wherein the alignment processing unit includes
a first alignment unit configured to align positions of original image components of the plurality of input images on the basis of the estimated positional displacement, and
a second alignment unit configured to align positions of deterioration models corresponding to the plurality of input images on the basis of the estimated positional displacement.

3. The image processing apparatus according to claim 1, wherein the lens information estimation unit estimates the lens information by comparing a deterioration degree of the input image and the deterioration model, the deterioration degree being obtained by canceling an original image component from the plurality of input images.

4. The image processing apparatus according to claim 3, wherein the lens information estimation unit estimates the lens information in such a way to minimize a difference between the deterioration degree of the input image and the deterioration model.

5. The image processing apparatus according to claim 1, wherein the deterioration model is a model prescribing deterioration of the input image depending on the lens information and a position in the input image.

6. The image processing apparatus according to claim 1, wherein the deterioration component is a characteristic of luminance shading, color shading, or aberration.

7. The image processing apparatus according to claim 1, wherein the lens information is an aperture value, a focal length or a focus distance, or an exit pupil diameter or an exit pupil distance.

8. The image processing apparatus according to claim 1, comprising:
a correction processing unit configured to correct a photographed image on a basis of the lens information and the deterioration model.

9. The image processing apparatus according to claim 1, wherein the alignment processing unit aligns the positions of the plurality of input images using block matching.

10. The image processing apparatus according to claim 1, comprising:
a luminance level adjustment unit configured to adjust luminance of the plurality of aligned input images.

11. The image processing apparatus according to claim 1, comprising:
a reduction unit configured to reduce the plurality of input images,
wherein the positional displacement estimation unit estimates the positional displacement on a basis of the plurality of reduced input images.

12. The image processing apparatus according to claim 1, wherein the lens information estimation unit
estimates, with respect to three or more input images, the lens information for the plurality of input images of a plurality of aligned combinations, and
estimates lens information that minimizes a difference from the deterioration model among pieces of the lens information estimated for the plurality of aligned combinations.

13. An image processing method, comprising:
estimating positional displacement between a plurality of input images obtained by photographing an identical photographic subject;
aligning positions of the plurality of input images on a basis of the estimated positional displacement; and
estimating lens information of a lens used to photograph an input image depending on a deterioration model indicating a deterioration component of the lens on a basis of the plurality of aligned input images.

* * * * *